US010653995B2

United States Patent
Keefer et al.

(10) Patent No.: US 10,653,995 B2
(45) Date of Patent: May 19, 2020

(54) SORPTION ENHANCED METHANATION OF BIOMASS

(71) Applicant: G4 Insights Inc., Burnaby (CA)

(72) Inventors: Bowie G. Keefer, Galiano Island (CA); Matthew L. Babicki, West Vancouver (CA); Brian G. Sellars, Coquitlam (CA); Edson Ng, North Vancouver (CA)

(73) Assignee: G4 Insights Inc., Burnaby, British Columbia (CA)

( * ) Notice: Subject to any disclaimer, the term of this patent is extended or adjusted under 35 U.S.C. 154(b) by 124 days.

(21) Appl. No.: 15/704,918

(22) Filed: Sep. 14, 2017

(65) Prior Publication Data

US 2018/0214815 A1  Aug. 2, 2018

Related U.S. Application Data

(63) Continuation of application No. 13/474,494, filed on May 17, 2012, now abandoned, which is a
(Continued)

(51) Int. Cl.
*B01D 53/047* (2006.01)
*B01D 53/22* (2006.01)
(Continued)

(52) U.S. Cl.
CPC ........... *B01D 53/047* (2013.01); *B01D 53/22* (2013.01); *C01B 3/38* (2013.01); *C10B 49/22* (2013.01);
(Continued)

(58) Field of Classification Search
CPC ........... B01D 53/047; B01D 2257/504; B01D 2257/30; B01D 2257/108;
(Continued)

(56) References Cited

U.S. PATENT DOCUMENTS 2,436,495 A   2/1948 Smith
3,070,703 A   12/1962 Podolny
(Continued)

FOREIGN PATENT DOCUMENTS

CA   1256038   6/1989
CA   2016045   8/1994
(Continued)

OTHER PUBLICATIONS

Peacocke (Notes on Terminology and Technology in Thermal Conversion, International Biochar Initiative).*
(Continued)

*Primary Examiner* — Ali Z Fadhel
(74) *Attorney, Agent, or Firm* — Klarquist Sparkman, LLP

(57) ABSTRACT

Disclosed embodiments provide a system and method for producing hydrocarbons from biomass. Certain embodiments of the method are particularly useful for producing substitute natural gas from forestry residues. Certain disclosed embodiments of the method convert a biomass feedstock into a product hydrocarbon by hydropyrolysis. Catalytic conversion of the resulting pyrolysis gas to the product hydrocarbon and carbon dioxide occurs in the presence of hydrogen and steam over a $CO_2$ sorbent with simultaneous generation of the required hydrogen by reaction with steam. A gas separator purifies product methane, while forcing recycle of internally generated hydrogen to obtain high conversion of the biomass feedstock to the desired hydrocarbon product. While methane is a preferred hydrocarbon product, liquid hydrocarbon products also can be delivered.

20 Claims, 10 Drawing Sheets

Related U.S. Application Data continuation of application No. PCT/CA2010/001859, filed on Nov. 18, 2010.

(60) Provisional application No. 61/262,485, filed on Nov. 18, 2009.

(51) Int. Cl.

| | | |
|---|---|---|
| *C01B 3/38* | (2006.01) | |
| *C10L 3/08* | (2006.01) | |
| *C10L 3/10* | (2006.01) | |
| *C10J 3/46* | (2006.01) | |
| *C10K 1/02* | (2006.01) | |
| *C10K 1/32* | (2006.01) | |
| *C10K 3/04* | (2006.01) | |
| *C10B 49/22* | (2006.01) | |
| *C10B 53/02* | (2006.01) | |
| *C10B 57/06* | (2006.01) | |

(52) U.S. Cl.
CPC ............ *C10B 53/02* (2013.01); *C10B 57/06* (2013.01); *C10J 3/463* (2013.01); *C10K 1/026* (2013.01); *C10K 1/32* (2013.01); *C10K 3/04* (2013.01); *C10L 3/08* (2013.01); *C10L 3/104* (2013.01); *B01D 2256/245* (2013.01); *B01D 2257/108* (2013.01); *B01D 2257/30* (2013.01); *B01D 2257/504* (2013.01); *C01B 2203/0233* (2013.01); *C01B 2203/062* (2013.01); *C10J 2300/0916* (2013.01); *C10J 2300/0966* (2013.01); *C10J 2300/0976* (2013.01); *C10J 2300/0996* (2013.01); *C10J 2300/1662* (2013.01); *C10J 2300/1807* (2013.01); *Y02C 10/08* (2013.01); *Y02C 10/10* (2013.01); *Y02E 20/16* (2013.01); *Y02E 50/14* (2013.01); *Y02P 20/145* (2015.11); *Y02P 20/152* (2015.11); *Y02P 20/52* (2015.11)

(58) Field of Classification Search
CPC ... B01D 2256/245; C10B 57/06; C10B 53/02; C10B 49/22; C10K 3/04; C10K 1/32; C10K 1/026; C10J 3/463; C10J 2300/1807; C10J 2300/1662; C10J 2300/0996; C10J 2300/0976; C10J 2300/0966; C10J 2300/0916; C10L 3/104; C10L 3/08; C01B 3/38; C01B 2203/062; C01B 2203/0233; Y02P 20/52; Y02P 20/145; Y02P 20/152; Y02E 50/14; Y02E 20/16; Y02C 10/10; Y02C 10/08
See application file for complete search history.

(56) References Cited

U.S. PATENT DOCUMENTS

| | | | |
|---|---|---|---|
| 3,336,162 A | 8/1967 | Zachmann | |
| 3,625,664 A | 12/1971 | Padovani | |
| 3,748,180 A | 7/1973 | Clausi et al. | |
| 3,847,672 A | 11/1974 | Trocciola et al. | |
| 3,865,924 A | 2/1975 | Gidaspow et al. | |
| 3,975,913 A | 8/1976 | Erickson | |
| 4,135,361 A | 1/1979 | Eisenhaure | |
| 4,386,309 A | 5/1983 | Peschka | |
| 4,532,192 A | 7/1985 | Baker et al. | |
| 4,555,453 A | 11/1985 | Appleby | |
| 4,595,642 A | 6/1986 | Nakanishi et al. | |
| 4,759,997 A | 7/1988 | Ohyauchi et al. | |
| 4,781,735 A | 11/1988 | Tagawa | |
| 4,801,308 A | 1/1989 | Keefer | |
| 4,816,121 A | 3/1989 | Keefer | |
| 4,822,935 A | 4/1989 | Scott | |
| 4,968,329 A | 11/1990 | Keefer | |
| 4,969,935 A | 11/1990 | Hay | |
| 4,988,580 A | 1/1991 | Ohsaki et al. | |
| 5,068,159 A | 11/1991 | Kinoshita | |
| 5,079,103 A | 1/1992 | Schramm | |
| 5,147,735 A | 9/1992 | Ippommatsu et al. | |
| 5,175,061 A | 12/1992 | Hildebrandt et al. | |
| 5,256,172 A | 10/1993 | Keefer | |
| 5,292,598 A | 3/1994 | Rosner | |
| 5,328,503 A | 7/1994 | Kumar | |
| 5,366,818 A | 11/1994 | Wilkinson et al. | |
| 5,408,832 A | 4/1995 | Boffito et al. | |
| 5,411,578 A | 5/1995 | Watson | |
| 5,434,016 A | 7/1995 | Benz et al. | |
| 5,504,259 A | 4/1996 | Diebold et al. | |
| 5,523,326 A | 4/1996 | Dandekar et al. | |
| 5,523,176 A | 6/1996 | Fonda-Bonardi | |
| 5,543,238 A | 8/1996 | Strasser | |
| 5,593,640 A | 1/1997 | Long et al. | |
| 5,604,047 A | 2/1997 | Bellows et al. | |
| 5,645,950 A | 7/1997 | Benz et al. | |
| 5,686,196 A | 11/1997 | Singh et al. | |
| 5,711,926 A | 1/1998 | Knaebel | |
| 5,714,276 A | 2/1998 | Okamoto | |
| 5,811,201 A | 9/1998 | Skowronski | |
| 5,832,728 A | 11/1998 | Buck | |
| 5,867,978 A | 2/1999 | Klanchar et al. | |
| 5,900,329 A | 5/1999 | Reiter et al. | |
| 5,917,136 A | 6/1999 | Gaffney et al. | |
| 5,981,096 A | 11/1999 | Hornburg et al. | |
| 5,982,857 A | 11/1999 | Kapoor et al. | |
| 6,045,933 A | 4/2000 | Okamoto | |
| 6,051,050 A | 4/2000 | Keefer et al. | |
| 6,110,612 A | 8/2000 | Walsh | |
| 6,170,264 B1 | 1/2001 | Viteri et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,194,092 B1 | 2/2001 | Ohara et al. | |
| 6,206,630 B1 | 3/2001 | Feltenberger et al. | |
| 6,283,723 B1 | 9/2001 | Milburn et al. | |
| 6,293,767 B1 | 9/2001 | Bass | |
| 6,305,442 B1 | 10/2001 | Ovshinsky et al. | |
| 6,312,843 B1 | 11/2001 | Kimbara et al. | |
| 6,627,338 B2 | 9/2003 | St-Pierre et al. | |
| 6,854,273 B1 | 2/2005 | Lasley et al. | |
| 6,863,878 B2 | 3/2005 | Klepper | |
| 7,553,568 B2 | 6/2009 | Keefer et al. | |
| 7,868,214 B2 | 1/2011 | Marker | |
| 7,872,054 B2 | 1/2011 | Cortright et al. | |
| 7,960,598 B2 | 6/2011 | Spilker et al. | |
| 8,015,808 B2 | 9/2011 | Keefer et al. | |
| 8,063,258 B2 | 11/2011 | Bartek et al. | |
| 8,147,766 B2 | 4/2012 | Spilker et al. | |
| 2002/0142198 A1 | 10/2002 | Towler et al. | |
| 2002/0142208 A1 | 10/2002 | Keefer et al. | |
| 2005/0006281 A1 | 1/2005 | Boger et al. | |
| 2007/0000177 A1 | 1/2007 | Hippo | |
| 2007/0170091 A1 | 7/2007 | Monnier et al. | |
| 2007/0272538 A1 | 11/2007 | Satchell | |
| 2008/0090113 A1 | 4/2008 | Keefer et al. | |
| 2008/0145309 A1 | 6/2008 | Bavarian et al. | |
| 2009/0082604 A1* | 3/2009 | Agrawal | C01B 3/042 585/242 |
| 2009/0165376 A1* | 7/2009 | Lau | C10J 3/463 48/73 |
| 2009/0217584 A1* | 9/2009 | Raman | C10J 3/00 48/127.7 |
| 2009/0263316 A1 | 10/2009 | Iyer et al. | |
| 2009/0263317 A1 | 10/2009 | Chen et al. | |
| 2010/0043278 A1 | 2/2010 | Brevoord et al. | |
| 2010/0228062 A1 | 9/2010 | Babicki et al. | |
| 2010/0251600 A1* | 10/2010 | Marker | C01B 3/16 44/308 |
| 2010/0251615 A1 | 10/2010 | Marker et al. | |
| 2010/0256428 A1 | 10/2010 | Marker et al. | |
| 2010/0257775 A1 | 10/2010 | Cheiky | |

(56) References Cited

U.S. PATENT DOCUMENTS

| | | | |
|---|---|---|---|
| 2010/0287836 A1 | 11/2010 | Robinson | |
| 2013/0023707 A1 | 1/2013 | Keefer et al. | |

FOREIGN PATENT DOCUMENTS

| | | |
|---|---|---|
| CA | 2109055 | 2/1999 |
| CA | 2087972 | 1/2000 |
| CA | 2087973 | 1/2001 |
| CA | 2475015 | 8/2003 |
| CA | 2476409 | 9/2003 |
| CA | 2718295 | 10/2009 |
| DE | 3913581 | 10/1990 |
| EP | 0 341 189 | 11/1989 |
| EP | 0 143 537 | 3/1990 |
| EP | 0 681 860 | 11/1995 |
| EP | 0 691 701 | 1/1996 |
| EP | 1 070 531 | 1/2001 |
| EP | 1 218 290 | 7/2002 |
| EP | 1 637 574 | 3/2006 |
| JP | 62278770 | 3/1987 |
| JP | 06-208853 | 7/1994 |
| JP | 07094200 | 4/1995 |
| JP | 07-279758 | 10/1995 |
| JP | 8045526 | 2/1996 |
| JP | 11214021 | 8/1999 |
| JP | 2000-072401 | 3/2000 |
| WO | WO 95/28510 | 10/1995 |
| WO | WO 99/46032 | 9/1999 |
| WO | WO 00/21911 | 4/2000 |
| WO | WO 00/75559 | 12/2000 |
| WO | WO 00/76628 | 12/2000 |
| WO | WO 00/76630 | 12/2000 |
| WO | WO 01/00987 | 1/2001 |
| WO | WO 02/35623 | 5/2002 |
| WO | WO 02/102943 | 12/2002 |
| WO | WO 2004/030130 | 4/2004 |
| WO | WO 2007/041293 | 12/2007 |
| WO | WO 2008/033812 | 3/2008 |
| WO | WO 2009/007061 | 1/2009 |
| WO | WO 2009/124017 | 10/2009 |
| WO | WO 2010/099626 | 9/2010 |

OTHER PUBLICATIONS

Florin et al. (International Journal of Hydrogen Energy 32 (2007) 4119-4134) (Year: 2007).*

Peacocke and Joseph, "Notes on Terminology and Technology in Thermal Conversion", International Biochar Conference (Year: 2014).*

Bain, "An introduction to Biomass Thermochemical Conversion," *DOE/NASLUGC Biomass and Solar Energy Workshops*, Aug. 3-4, 2004, National Renewable Energy Laboratory, 77 pages.

Bridgewater, "Renewable fuels and chemicals by thermal processing of biomass," *Chemical Engineering Journal* 91:87-102, 2003.

Carson et al., "Thermodynamics of Pressure Swing Adsorption (PSA) in the Recovery of Residual Hydrogen from SOFC Anode Gas," *Proceedings of the Intersociety Energy Conversion Engineering Conference* Conf.30:229-234, Jan. 1, 1995.

Chatsiriwech et al., "Enhancement of Catalytic Reaction by Pressure Swing Adsoprtion," *Catalysis Today* 20:351-366, 1994.

Florin et al., "Hydrogen production from biomass coupled with carbon dioxide capture: The implications of thermodynamic equilibrium," *International Journal of Hydrogen Energy* 32:4119-4134, 2007.

Florin et al., "Enhanced hydrogen production from biomass with in situ carbon dioxide capture using calcium oxide sorbents," *Chemical Engineering Science* 63:287-316, 2008.

Fyke et al., "Recovery of Thermomechanical Exergy From Cryofuels," *Int. J. Hydrogen Energy* 22(4):435-440, 1997.

Huber et al., "Synthesis of transportation fuels from biomass: Chemistry, catalysts, and engineering," *Chemical Reviews, American Chemical Society* 106(9):4044-4098, 2006.

Hufton et al., "Sorption Enhanced Reaction Process for Hydrogen Production," *AIChE Journal* 45(2):248-256, 1999.

Johnson et al., "Sorption-enhanced steam reforming of methane in a fluidized bed reactor with dolomite as CO2-acceptor," *Chemical Engineering Science* 61:1195-1202, 2006.

Morsi, "Twenty-Fifth Annual International Pittsburgh Coal Conference: Coal—Energy, Environment and Sustainable Development; Abstracts Booket," Pittsburgh Coal Conference, 64 pages, 2008.

Oshima et al., "The utilization of $LH_2$ and LNG cold for generation of electric power by a cryogenic type Stirling Engine," *Cryogenics* 617-620, Nov. 1978.

Peacocke et al., "Notes on Terminology and Technology in Thermal Conversion," *International Biochar Initiative*, 5 pages, 2005.

Pfeifer et al., "Comparison of dual fluidized bed steam gasification of biomass with and without selective transport of CO2," *Chemical Engineering Science* 64:5073-5083, 2009.

Vaporciyan et al., "Periodic Separating Reactors: Experiments and Theory," *AIChE Journal* 35:831-844, 1989.

Extended European Search Report dated Jun. 20, 2013, from European Patent Application No. 10748278.8.

Extended European Search Report dated Apr. 24, 2013, from European Patent Application No. 10830995.6.

Supplemental European Search Report dated Nov. 26, 2013, from European Patent Application No. 10831012.9.

International Search Report dated May 21, 2010, from International Application No. PCT/CA2010/000328.

International Search Report dated Feb. 7, 2011, from International Application No. PCT/CA2010/001833.

International Search Report dated Feb. 8, 2011, from International Application No. PCT/CA2010/001859.

* cited by examiner

SORPTION ENHANCED METHANATION OF BIOMASS

CROSS REFERENCE TO RELATED APPLICATION

This is a continuation of U.S. patent application Ser. No. 13/474,494, filed May 17, 2012, which is a continuation application under 35 U.S.C. § 120 of International Patent Application No. PCT/CA2010/001859, filed Nov. 18, 2010, which claims the benefit of the earlier filing date of U.S. Provisional Application No. 61/262,485, filed Nov. 18, 2009. Each of these prior applications is incorporated herein by reference.

FIELD

The process of the invention applies to hydropyrolysis of carbonaceous feedstocks, and particularly of forestry residues, to generate higher value synthetic fuels, in particular methane and optionally liquid hydrocarbons.

BACKGROUND

Thermochemical conversion of biomass such as sawmill wood wastes, forestry residues and agricultural wastes into synthetic fuels is an important emerging avenue for advancement of renewable energy sources to supplement or replace fossils fuels. While air blown gasification is used for generation of lower heating value fuel gas, several variants of oxygen or steam gasification can be used for production of syngas containing minimal nitrogen. Syngas is a gas mixture containing mostly hydrogen and carbon monoxide, and is a versatile feedstock for further chemical processing into a wide range of useful fuels and chemical compounds. Syngas can be catalytically converted into methane, Fischer-Tropsch liquid fuels, methanol, dimethyl ether, or hydrogen. The methanation reaction of syngas to generate methane and byproduct water vapour is typically conducted over nickel catalysts at temperatures in the range of about 300° C. to about 400° C., and preferably at elevated pressure.

Methane is readily marketed and delivered through existing natural gas distribution infrastructure as substitute natural gas (SNG) for numerous end uses including space heating and electrical power generation. Methane has considerably higher energy density than hydrogen, and can be converted into syngas or hydrogen by catalytic steam reforming. Modern combined cycle power plants are conveniently fueled by natural gas. Methane is also a particularly advantageous fuel for future high temperature fuel cell power plants using highly endothermic internal steam reforming of natural gas to recover high grade heat generated by the fuel cell stack.

The reaction of steam with biomass to generate syngas is highly endothermic, hence conducted with direct or indirect heating by partial oxidation with air or oxygen; and is typically conducted at much higher temperature than the subsequent exothermic methanation reaction. The thermal mismatch between gasification and methanation reactions is detrimental to process efficiency.

Hydrogasification has previously been investigated for gasification of biomass. The key reaction is hydrogenation of carbon to form methane, whose exothermicity is a great advantage compared to other gasification approaches. As hydrogen is a premium fuel, its consumption in large amounts has presented the appearance of a major economic barrier.

The endothermic nature of the syngas formation reaction from the reaction of biomass pyrolysis gas and steam requires enthalpy heat to be added (typically by partial combustion with added oxygen). Temperatures well in excess of 650° C. are typically required to reduce tars to reasonable levels.

The gas composition produced in biomass gasification approaches a complex equilibrium established between CO, $CO_2$, $H_2$, $H_2O$ and $CH_4$ which is a function of temperature, pressure and overall gas composition. Reforming reactions producing syngas increasingly dominate the equilibrium at temperatures above 650° C. at the expense of hydrocarbons, $CO_2$ and water.

The use of catalysts, such as the use of olivine, dolomite or nickel coated media in fluidized beds, to enhance the rate of syngas formation is well known. These catalysts allow a faster reaction towards syngas equilibrium favoured under the process conditions. Catalysts have also been used in a secondary bed in series with the gasifier for the reduction of tars contained in the syngas or producer gas.

An oxygen blown entrained flow gasifier may typically operate at about 1300° C. to 1500° C., at which temperatures methane and higher hydrocarbons are all nearly entirely converted to syngas. This has the important advantage of almost completely eliminating tar constituents, but the disadvantage for SNG production that all of the product methane must be generated by the exothermic methanation of syngas at much lower temperature than the gasification temperature.

Indirect steam gasifiers (such as the US Battelle/FERCO "Silvagas" system, the Austrian fast internally circulating fluidized bed (FICFB) system, and the Dutch ECN "Milena" system) operate at about 850° C. These systems use twin bed configurations, in which fluidized granular heat transfer media is circulated between a gasification zone in which steam reacts with the biomass to produce syngas and char, and an air-blown regeneration zone in which the char is combusted to reheat the media. The product syngas contains a significant admixture of methane generated within the gasifier. While downstream processing is required to convert or remove tar constituents, an important advantage for SNG production is that only about 55% to 60% of the final product methane must be generated by methanation of syngas, since a useful fraction of the methane was already produced with the syngas.

Some recent improvements to the twin bed gasification approach have been based on adsorption enhanced reforming ("AER") in which a $CO_2$ acceptor such as lime or calcined dolomite is included in the granular media to remove carbon dioxide by carbonation from the gasification zone operating typically at about 600° C., and to release the carbon dioxide by calcining in the regeneration zone operating typically at about 800° C. The AER process has been disclosed by Specht et al. (European patent publications EP 1,218,290 B1 and EP 1,637,574 A1). The principle of the AER process is to generate hydrogen-rich syngas by shifting the reaction equilibria of the steam reforming and water gas shift reactions by $CO_2$ removal. The AER process has been tested in the FICFB twin bed system, and is being developed for SNG production by using a molten salt methanation reactor to convert the syngas into methane.

Twin bed indirect steam biomass gasifiers, and experimental AER systems derived from twin bed gasifiers, have been operated at atmospheric pressure. Air blown combustion regeneration of pressurized fluidized beds would present challenges. ECN have considered operation of the Milena twin bed gasification system pressurized to about 7 bara.

There is a need to provide more efficient internally self-sustaining generation of the hydrogen needed for hydrogasification, which otherwise is an extremely attractive approach for conversion of biomass and other carbonaceous feedstocks into methane and other high value synthetic fuels.

SUMMARY

While the "sorption enhanced reforming" (SER) process [known in Europe as "absorption enhanced reforming" or AER] concerns generating hydrogen-rich syngas, which may be converted downstream in a separate methanation reactor into SNG, disclosed embodiments of the present invention concern the new principle of absorption enhanced methanation ("SEM"). Whereas carbon is nearly entirely removed from the feed syngas by carbonation of the sorbent in AER, only about half of the carbon is similarly removed in SEM.

Methanation as described in this disclosure is hydroconversion of a pyrolysis gas to produce methane, including but not confined to the conversion of syngas to methane.

It has been found unexpectedly that maintenance of a high hydrogen back-pressure in SEM will inhibit decomposition of methane by steam methane reforming, while carbon oxides are preferentially removed. Because only about half of the carbon contained in the initial syngas is removed by carbonation in SEM, the $CO_2$ sorbent has much lighter duty in SEM as compared with SER.

Thermodynamic modeling indicates that slightly more than half of the carbon not rejected as char or coke deposits can be converted to methane under conditions of hydrogen self-sufficiency. Approximately 20% of the carbon originally in the biomass will typically be rejected as char or coke to be combusted or gasified in the regeneration reactor. If a supplemental source of hydrogen is available, the conversion of feed carbon to methane can be increased within the scope of the present invention, while even less of the carbon will be removed by carbonation of the sorbent.

SEM may be advantageously operated at moderately elevated working pressures in a range of just over 1 bara to about 50 bara, or in a preferred range of from about 5 bara to about 30 bara. While SEM can be conducted at atmospheric pressure, the methane concentration will be lower than at higher operating pressures, thus making the gas separation of hydrogen and methane more difficult. Conventional methanation requires much higher working pressures to achieve satisfactory conversion.

A preferred $CO_2$ sorbent for SEM is CaO, which can be used in any suitable form, or combinations thereof, such as calcined limestone or dolomite, or CaO on a suitable support such as alumina. CaO is readily carbonated at working temperature around 600° C. and moderate pressures from atmospheric upward. Such temperature and pressure conditions have been found to be favourable for the hydrogasification of biomass pyrolysis gas to methane, and for steam reforming of methane to generate hydrogen.

Various $CO_2$ sorbents or "acceptors" will work in the temperature range of from about 500° C. to about 650° C. of interest for SEM. These include calcined dolomite, calcium oxide, calcium hydroxide, lithium zirconate, lithium orthosilicate, and other metal oxides or hydroxides that can react with carbon dioxide to form a carbonate phase.

While hydroconversion of biomass pyrolysis gas to methane works favourably at temperatures in the range of from about 500° C. to about 650° C., productive hydroconversion of pyrolysis gas to liquid hydrocarbons requires lower temperatures in the range of from about 300° C. to about 400° C. CO and $CO_2$ are extracted from the oxygenated pyrolysis gas by decarbonylation and decarboxylation respectively, in parallel with extraction of $H_2O$ by hydrodeoxygenation. As CO and $H_2O$ can be consumed to generate $H_2$ and $CO_2$ by the water gas shift reaction, it may be advantageous to remove $CO_2$ by a carbonation reaction in order to maximize the generation of hydrogen by water gas shift. Suitable $CO_2$ sorbents for the temperature range of from about 300° C. to about 400° include potassium-promoted hydrotalcites, magnesia supported on alumina, or dolomite in combination with alkali (and particularly potassium) promoters.

Certain disclosed embodiments provide a method for converting a biomass feedstock into a product hydrocarbon comprising:

a. subjecting the feedstock to fast pyrolysis with rapid pyrolytic heating in the substantial absence of oxygen, or hydropyrolysis as fast pyrolysis in the presence of hydrogen, in order to generate fractions of pyrolysis gas and char;

b. catalytically converting at least a portion of the pyrolysis gas to a product hydrocarbon and carbon dioxide in the presence of hydrogen and steam, while removing carbon dioxide by carbonation of a sorbent;

c. generating at least a portion of the hydrogen by reaction between steam and a portion of the pyrolysis gas or a product hydrocarbon;

d. separating hydrogen from the hydrocarbon product, and recycling the hydrogen so as to force the conversion of biomass into the hydrocarbon product; and e. regenerating the sorbent by heating through combustion of the char to release the carbon dioxide.

The fast pyrolysis step may be performed with externally heated media, e.g. circulating through a pressurized auger reactor, and preferably as hydropyrolysis in a hydrogen atmosphere. The heat transfer media may include circulating magnetite pellets, which are readily separable from char according to density and magnetic properties. Some impurities such as alkalis, other metals, sulphur, and chloride will be partially entrained by the char. While very fast pyrolysis will minimize char production, slower pyrolysis may also be considered for coproduction of charcoal or biochar with lower yield of methane and any other desirable hydrocarbon products.

The catalytic conversion step includes catalytic hydrogasification, such as steam hydrogasification. Hydroconversion, hydrodeoxygenation, and hydrocracking reactions will take place. The net reaction will be exothermic. This step may be conducted alternatively in any suitable reactor architecture, such as the following reactor architectures:

a) bubbling or circulating fluidized bed;

b) fixed bed with granular packing or monolithic catalyst, and rotary or directional valve logic for cyclically switching beds between reaction and regeneration steps;

c) moving bed with granular catalyst.

The hydrogasification process requires a source of hydrogen, either externally supplied or internally generated. According to certain disclosed embodiments of the present invention, steam addition, plus moisture contained in feed biomass, provides sufficient steam for internal, self-sustaining generation of hydrogen required for the hydrogasification reaction to convert biomass feedstock into methane.

Certain disclosed embodiments of the invention may be realized by any of the following operating modes:
1. Self-sustaining recycle of $H_2$ generated within catalytic stage with sufficient $H_2$ excess to overcome incomplete recovery in downstream gas separation of recycle $H_2$. Methane yield is approximately 50% of carbon after char production, balance primarily to $CO_2$ with preferred use of water gas shift reaction to consume most CO.
2. Supplemental hydrogen may provided from any combination of (a) an external source of hydrogen rich gas, or (b) oxygen or steam gasification of char offgas, or (c) steam methane reforming of a portion of the methane product.
3. The process in preferred embodiments includes methanation, regeneration and reforming steps. Higher temperature, high steam concentration and low hydrogen concentration drive the reforming reaction forward. Lower temperature, low steam concentration and high hydrogen concentration drive the methanation reaction forward. Reforming and methanation may take place in each of the reforming and methanation steps, with the equilibrium balance reflecting not only bed temperature but also the steam/hydrogen ratio over the catalyst. The catalyst beds are cooled by reforming, heated by methanation and strongly heated to the maximum process temperature by regeneration. The reforming step follows the regeneration step to take advantage of sensible heat in the bed, then the methanation step follows after the catalyst bed has been cooled by the reforming step, and then the next regeneration step takes place to finish reheating the bed up to its cyclic maximum temperature. Such embodiments are an inventive extension of the known principle of cyclic reforming in which sensible heat for repeated reforming steps is provided by alternatingly repeated regeneration steps, with certain embodiments of the present inventive process also including methanation steps following reforming steps and preceding regeneration steps.

With larger steam supply, higher temperature and/or lower operating pressure, the process may generate excess syngas or hydrogen so that coproduction of methane and hydrogen/syngas may be contemplated. Coproduction of methane and higher hydrocarbon fuel commodities is also attractive.

The process also may include cleaning steps to remove catalyst poisons (alkalis, other metals, phosphorus, sulfur, chloride, etc.) and tars. Hot or cold clean-up process alternatives are well known.

Hot clean-up steps include sorbents (e.g. ZnO to remove sulphur), and catalytic tar cracking followed by cool-down in cyclic thermal regenerator loaded with layers of fine filtration metal matrix, porous ceramic, catalyst and adsorbent. Regeneration can be achieved by burning off tar and coke deposits, then air flush to cool the filtration matrix and provide hot air for front end feed dryer.

Cold clean-up can be achieved by higher temperature oil quench and wash, followed by lower temperature water quench and wash.

The process may also include gas separation steps for removing $CO_2$, for recovering a hydrogen-enriched recycle stream for the hydrogasification step, and/or for purifying the product methane. Preferred gas separation alternatives include carbonation of CaO or pressure swing adsorption (PSA) for $CO_2$ removal, and PSA or polymeric membranes for separation of $H_2$ from $CH_4$.

One disclosed apparatus includes a hydropyrolysis reactor. Alternative embodiments include a single stage reactor, or a two-stage system including a pyrolysis or hydropyrolysis reactor as the first stage, and a methanation or hydroconversion reactor as the second stage. The process achieves catalytic steam hydrogasification, with catalytic hydrocracking of tars favoured by relatively high hydrogen partial pressure.

The process includes sequential steps for (1) the working reaction by hydrogasification or hydroconversion combined with sorbent carbonation, and (2) regeneration of sorbent and catalysts. Combined regeneration of the sorbent (carbon dioxide acceptor) and catalyst is a very attractive operating mode.

Alternative reactor configurations include fixed beds with granular or monolithic catalyst with directional or rotary valves for cyclic switching of beds between the process steps of working reaction and regeneration, or fluidized beds with circulation to achieve the process steps. Twin fluidized beds are a suitable architecture for indirect steam gasifiers, achieving the working reaction in one bed, and regeneration by combustion of char in the other bed.

An important aspect of the invention is heat management. Combined exothermicity of sorption carbonation and methanation reactions provide abundant heat for preheating feedstock and steam generation, with reduced need for feedstock drying. Heat for sorbent and catalyst regeneration can be generated by combustion of relatively low value fuels, such as byproduct char or raw biomass feedstock.

Introduction of fibrous biomass with inconsistent properties into pressurized pyrolysis or gasification plants is a difficult challenge. Water slurry feed is mechanically attractive, but is incompatible with the normal requirement that the feed biomass be substantially dry. The present process is tolerant of relatively wet feed, because of the strong combined exothermicity of the methanation and sorbent carbonation reactions. Another novel approach for slurry feed within the present invention is to provide a pusher centrifuge dewatering system within the high pressure containment volume of the plant.

Catalyst and sorbent regeneration can be achieved in a regeneration reactor zone integrated with the pressurized combustor of gas turbine, or supplied with superheated steam with optional addition of enriched oxygen.

High methane yield can be achieved in hydrogasification, however in absence of a supplemental source of imported hydrogen up to half of that methane may be consumed downstream to generate recycle hydrogen and $CO_2$. A preferred operating mode is defined by self-sustaining recycle of $H_2$ generated within a catalytic stage, with just enough $H_2$ excess to compensate for incomplete recovery in downstream gas separation of recycle $H_2$. Methane yield is approximately 50% of carbon after char production, with the remaining carbon being converted to $CO_2$.

Supplemental hydrogen may provided from any combination of (a) an external source of hydrogen-rich gas such as stranded hydrogen offgas from a chlor-alkali or ethylene plant, or (b) oxygen or steam gasification of char, or (c) steam methane reforming of a portion of the methane product. The process may be operated with any amount of hydrogen recycle, including the limiting case of zero hydrogen recycle, in which case the methane rich product gas will contain relatively less hydrogen but significantly larger amounts of carbon dioxide and carbon monoxide. In the opposite limiting case, zero methane is delivered so that maximum hydrogen may be generated; and hydrogen-rich syngas may then be delivered as a desired product. Coproduction of methane and hydrogen, or hydrogen-rich syngas, is an option within the scope of the invention.

Separation of hydrogen and methane can be achieved by pressure swing adsorption, membrane permeation, refrigerated hydrate formation or cryogenics. While sorption-enhanced reactors for SMR and/or methanation have integrated bulk $CO_2$ removal, further purification of product streams will generally be needed to remove slip of CO or $CO_2$ as required.

The invention provides a wide spectrum of cogeneration opportunities. The process can generate a range of hydrocarbon products (methane, LPG, and liquid hydrocarbons). Syngas and hydrogen are generated within the process, either consumed entirely within the hydrocarbon producing hydroconversion processes, or alternatively a portion of syngas or hydrogen may be exported as a useful product at some penalty of reducing the conversion of biomass carbon to hydrocarbons. Syngas is an intermediate for synthesis of a wide range of useful fuel and chemical products.

The hydropyrolysis reaction delivers a product stream of methane plus hydrogen, and minor amounts of CO and $CO_2$. Syngas may also be generated by oxygen/steam gasification of char. The syngas generated by char gasification will typically have a low ratio of $H_2$ to CO, which can be upgraded by admixture with $H_2$ generated by the hydropyrolyser. A ratio of $H_2$:CO~2 is desirable for synthesis of methanol, dimethyl ether, or Fischer-Tropsch hydrocarbons.

Other cogeneration opportunities provided by the invention include the production of energy as heat or electricity. Heat recovery within the process can readily generate steam at different temperatures. Product or byproduct fuels can be used to power electrical generators through gas turbines, internal combustion engines or steam turbines. Some of the most attractive future applications of the present invention will be obtained by integration of high temperature fuel cells with the hydrogasfication of biomass.

As first suggested in copending U.S. patent application Ser. No. 11/869,555, biomass hydrogasification may be directly integrated with SOFC power plants having enriched $H_2$ recycle for the anode of an internal reforming SOFC. The present invention develops practicable implementations of that opportunity. Without the relatively low operating pressures enabled by the inventive sorption enhanced methanation process, it would be very difficult to integrate the usually relatively low pressure SOFC system with the relatively high pressure hydrogasification processes.

When the oxidant for catalyst and sorbent regeneration by combustion of char and coke is enriched oxygen, a concentrated product stream of $CO_2$ can be delivered for useful applications including enhanced oil recovery, or for disposal by underground sequestration.

The foregoing and other objects, features, and advantages of the invention will become more apparent from the following detailed description, which proceeds with reference to the accompanying figures.

DETAILED DESCRIPTION

Figure 1:
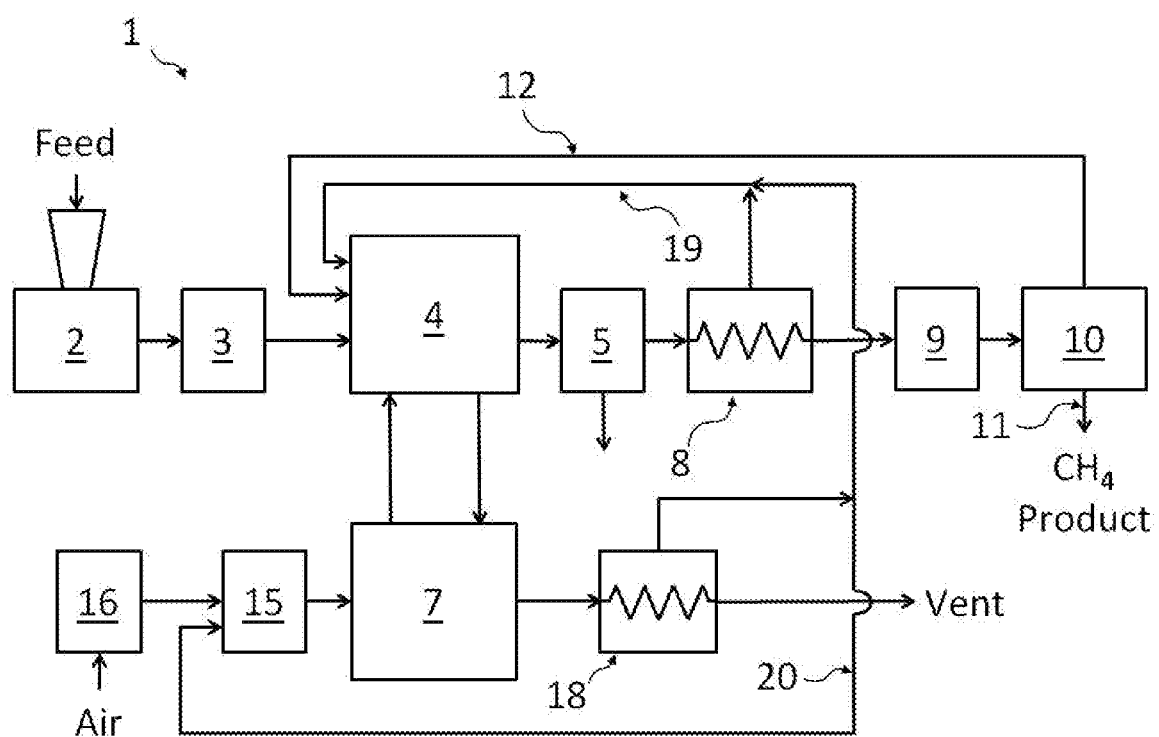
FIG. 1 is a schematic diagram of one embodiment of an apparatus according to the present invention.

FIG. 1 shows a simplified schematic of a system or apparatus 1 according to the invention. Apparatus 1 includes a feed preparation section 2, a feed pressurization section 3, a hydrogasification reactor 4, a solids separation section 5, a regeneration reactor 7, a heat recovery section 8, a tar scrubber 9, and a gas separation section 10. The gas separation section 10 separates hydrogen from methane, and may be based on selective membranes or on pressure swing adsorption (PSA). Gas separation section 10 delivers a substantially purified methane product stream from conduit 11, and a hydrogen-enriched recycle stream back to hydrogasification reactor 4 via conduit 12. It is a key feature in some preferred embodiments of the present invention that the gas separation system 10 can be operated so as to minimize hydrogen concentration in the product methane stream, thus preventing most of the hydrogen from exiting apparatus 1 until consumed in hydrogasification to produce the desired methane product.

A membrane permeation system may be advantageously used as gas separation system 10 for purification of product methane and separation of hydrogen-rich gas for recycle to hydrogasification. The polymeric membrane will selectively permeate hydrogen, carbon monoxide, carbon dioxide and water vapour relative to methane. In order to obtain product methane containing no more than 1% hydrogen, three membrane stages may be used in series to progressively concentrate methane with high recovery and purity in the retentate stream. The feed gas is introduced to the inlet of the first stage, from which the hydrogen-enriched recycle gas will be delivered as low pressure permeate. The permeate of the second stage will be recompressed to join the feed at the inlet of the first stage, while the permeate of the third stage will be recompressed to the inlet of the second stage.

Alternatively, pressure swing adsorption may be used as gas separation system 10 for purification of product methane and separation of hydrogen-rich gas for recycle to hydrogasification.

Hydrogasification reactor 4 and regeneration reactor 7 comprise a coupled reactor pair for the working hydrogasification reaction and regeneration steps. Each of reactors 4 and 7 comprises at least one bed containing a $CO_2$ sorbent, and optionally also another solid component having catalytic and favourable heat transfer media characteristics. It is contemplated that the beds will cycle or be switched between the hydrogasification and regeneration reaction zones.

Pressure and temperature conditions in the hydrogasification reactor 4 will be selected to be favourable for combined methanation and steam reforming reactions such that the process achieves self-sufficiency in producing the amount of hydrogen needed for the methanation reaction, while also favourable for the carbonation reaction binding $CO_2$ to the sorbent. The regeneration reactor 7 will typically be operated at relatively higher temperature in order to release the $CO_2$ from the sorbent, and may be operated at substantially the same pressure or at lower pressure to facilitate regeneration and reduce air compression requirements for regeneration.

A preferred $CO_2$ sorbent is CaO, alternatively provided by calcining of natural limestone or dolomite, or by synthesis to achieve enhanced mesoporosity and stability for extended cycling without rapid deactivation due to sintering and pore blockage. It has been found in the art that composite structures comprising CaO supported on or encapsulated in a mesoporous ceramic (e.g. alumina) may achieve superior durability against deactivation, while also providing a hardened external shell for superior attrition resistance. Such mesoporous composite structures may be usefully applied in fixed bed monoliths as well as in granular media for fluidized bed operations. The present invention contemplates the use of zirconia and alumina for such mesoporous composites with CaO.

At relatively higher pressures around 30 bara and with high steam concentrations during sorbent processing, $Ca(OH)_2$ may be a useful intermediate between CaO and $CaCO_3$. It is known that the sintering longevity problems in cycling between CaO and $CaCO_3$ may be largely avoided by cycling between oxide, hydroxide and carbonate compounds of the sorbent.

The regeneration gas for regeneration reactor 7 provides heat for calcining the sorbent, and oxygen and/or steam for decoking the catalyst, while serving as sweep gas to purge $CO_2$ released in calcining and decoking functions. A preheater 15 is provided to preheat air or enriched oxygen provided for oxidation and sweep gas functions, while superheating any steam provided to assist decoking and as sweep gas. A feed air compression unit 16 is provided, which would usually be an air compressor. Feed air compression unit 16 may alternatively include a feed air blower, a pressure swing adsorption oxygen enrichment unit, and an oxygen compressor delivering oxygen to preheater 15. Oxygen enrichment may be desired to reduce air compression loads in higher working pressure embodiments of the process, or to facilitate capture of concentrated $CO_2$ from the exhaust. A heat recovery section 18 is provided to recover heat from the $CO_2$ and sweep gas discharged to exhaust.

Heat recovery sections 8 and 18 are here contemplated to be steam generators, providing steam by conduit 19 to hydrogasification reactor 4 and optionally in some embodiments also by conduit 20 to preheater 15 and regeneration reactor 7.

Feed preparation section 2 includes steps of sizing and drying as necessary. Feed pressurization section 3 includes a lock hopper system or a pressure feeder device to introduce the feed biomass into the pyrolysis and gasification process at a working pressure of preferably about 5 bara to about 50 bara, and more preferably about 10 bara to about 20 bara.

Solids are removed from the effluent pyrolysis gas exiting hydrogasification reactor 4 by a solids removal section 5 including one or multiple cyclones, and optionally also high temperature filters such as metallic or ceramic candle filters. A desulfurization reactor (e.g. using zinc oxide for $H_2S$ removal), or sorbent beds for removal of alkalis or chlorides, may be included here for protection of any downstream catalysts.

Figure 2:
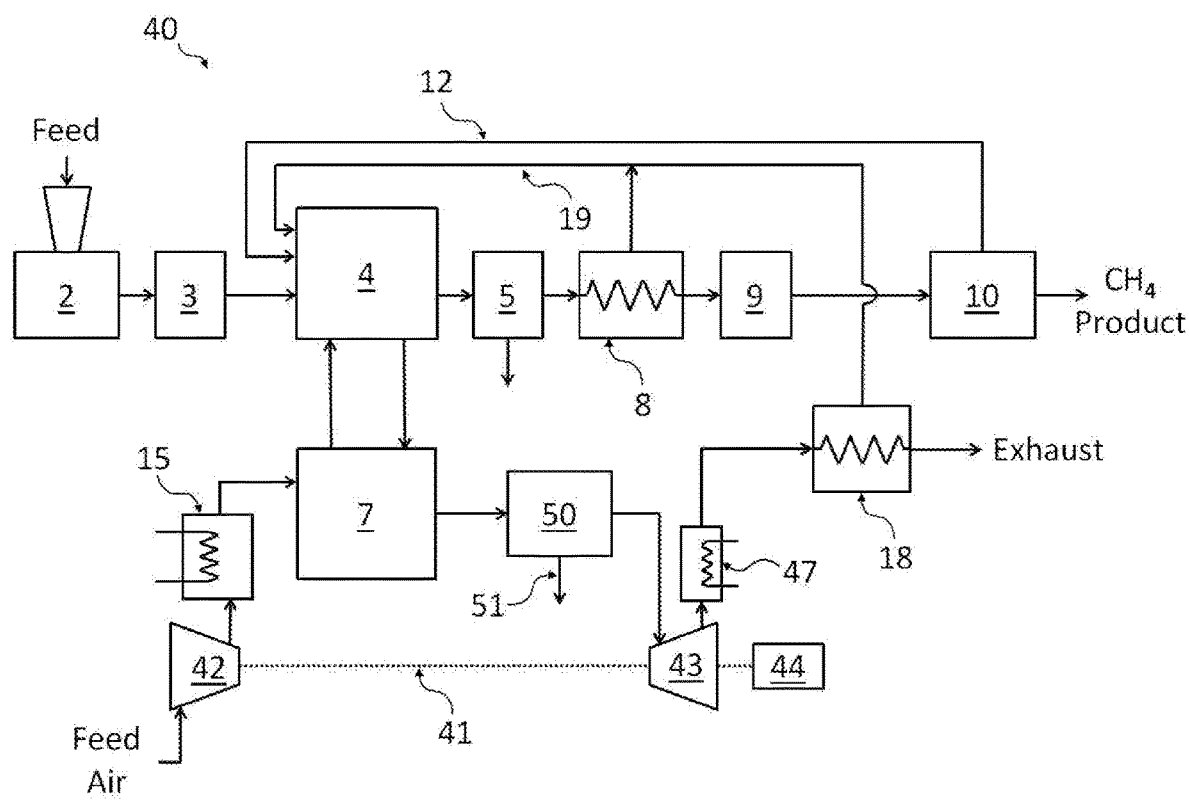
FIG. 2 shows an embodiment with integration to a gas turbine power plant.

FIG. 2 shows a simplified schematic of an alternative apparatus 40 with the regeneration reactor 7 embedded in a gas turbine 41 to enable the efficient use of pressurized air for regeneration. Gas turbine 41 includes a compressor 42 coupled to a high temperature expander 43 and a mechanical load 44 which may be an electrical generator. The expanded exhaust from expander 43 includes vitiated air and $CO_2$ released from the sorbent, and is subjected to heat recovery in heat exchanger 47 before generating steam in downstream heat recovery section 18. Heat exchanger 47 provides heat to preheater 15 in this embodiment, and may be directly integrated with preheater 15 in well known recuperator or rotary regenerator embodiments well known in the gas turbine art.

In order to protect the turbine blades of expander 43 from erosion, corrosion or fouling damage, it is necessary to provide a hot gas clean-up section 50 to remove solid particulate, alkalis and any chloride or sulphur compounds that have not been retained by the sorbent under regeneration conditions. The hot gas clean-up section 50 will include cyclones, filters (metal fabric, ceramic candles or precoat filters), and chemical sorbents as necessary to capture the alkalis and any other detrimental components. Captured solids and spent sorbents will be released from discharge conduit 51.

Figure 3:
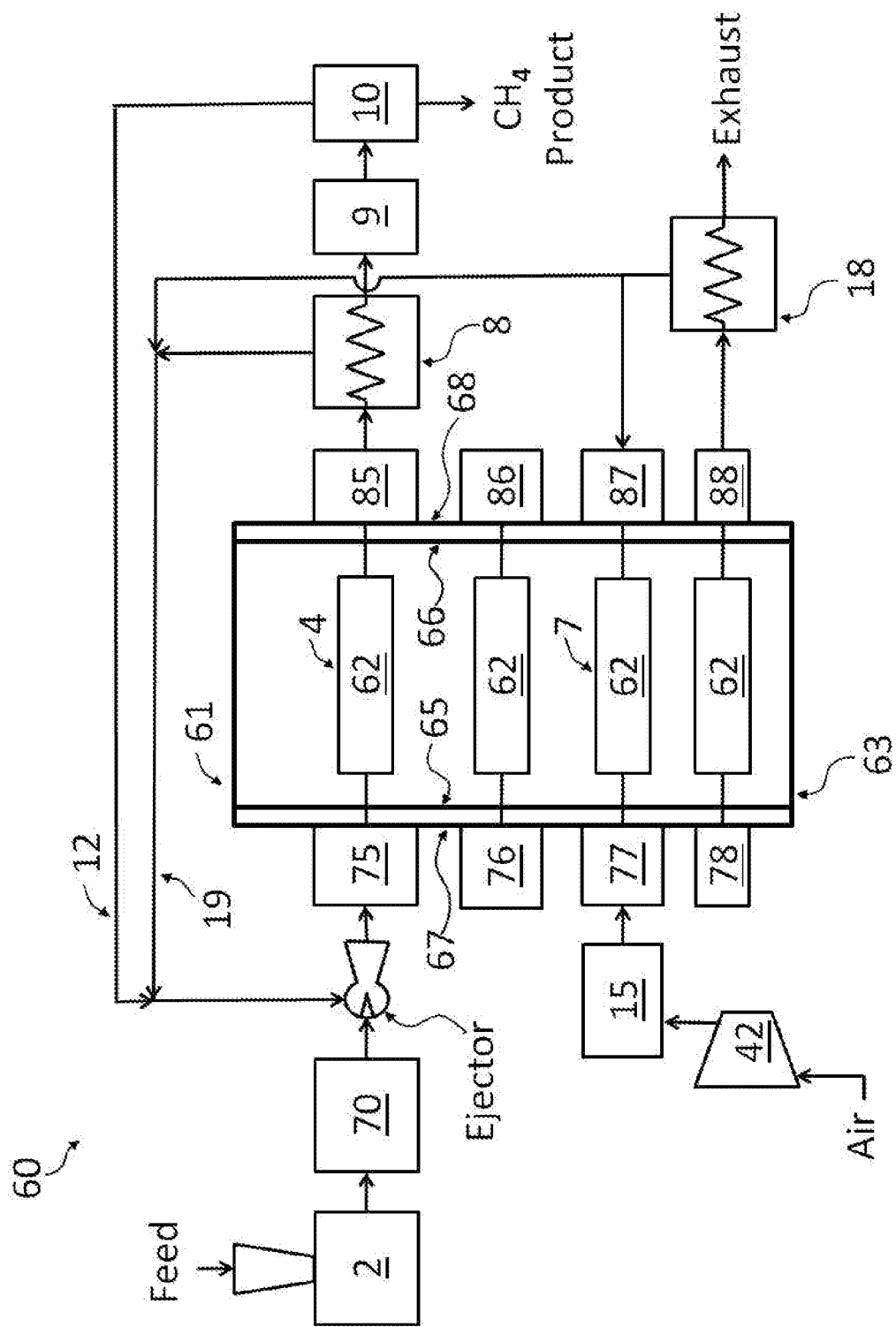
FIGS. 3 and 4 show an embodiment with a rotary reactor including cyclically switched hydrogasification and regeneration zones.
Figure 4:
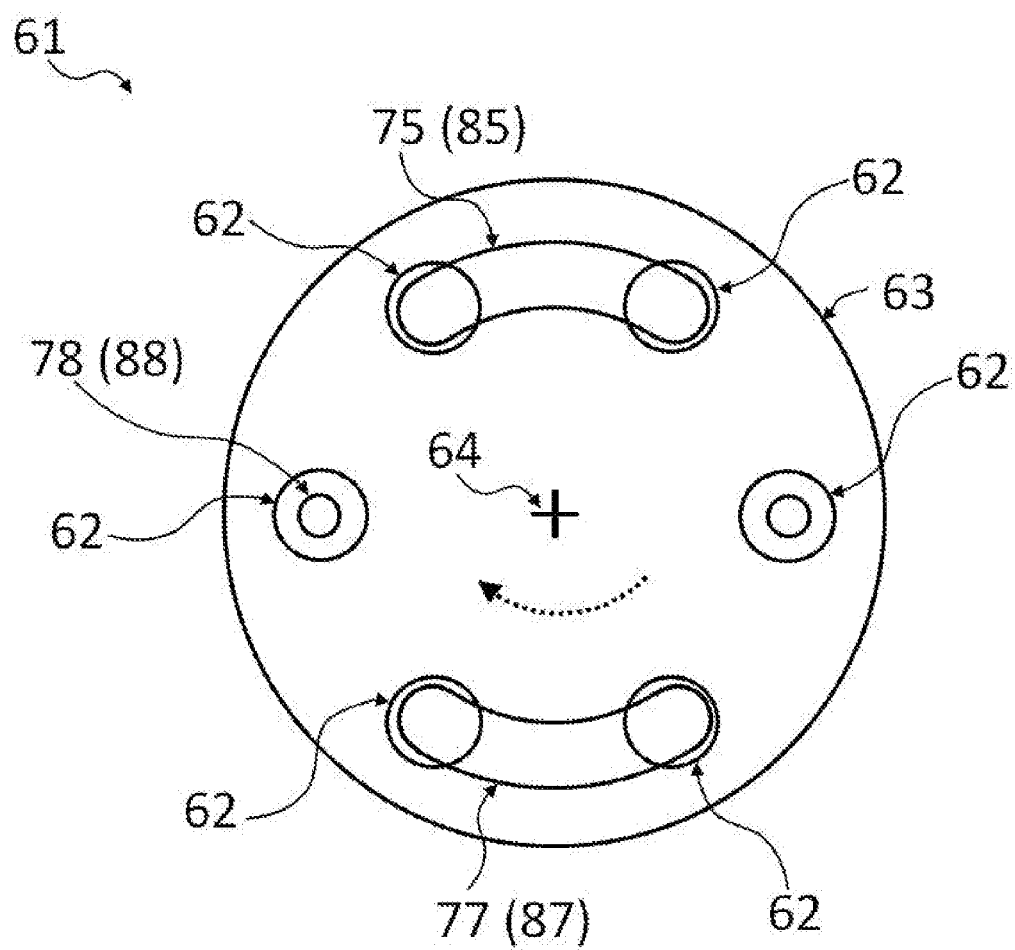

FIGS. 3 and 4 show an embodiment 60 with rotary fixed bed reactors that will be particularly useful for smaller scale applications of the invention, e.g. for local supply of methane fuel from forestry operations in remote areas.

Reactors 4 and 7 are combined in a cyclic rotary reactor 61. A plurality of fixed beds 62 are mounted in a rotor 63 rotating about rotary axis 64 between a first rotary valve face 65 and a second rotary valve face 66. First rotary valve face 65 engages sealingly with a first valve stator face 67, and second rotary valve face 66 engages sealingly with a second valve stator face 68. Fluid connection ports 75, 76, 77 and 78 are provided in first valve stator face 67, while fluid connection ports 85, 86, 87 and 88 are provided in second valve stator face 68. FIG. 4 shows the ports for the first valve stator face, with bracketed reference numerals for the corresponding ports of the second valve stator face.

The biomass feed is pressurized and decomposed by pyrolysis reactor 70 before admission to port 75. Conduits 12 and 19 respectively provide recycle hydrogen and steam to port 75. Raw product methane gas is delivered from port 85 to heat recovery, clean-up and purifications steps.

Preheated regeneration air is introduced to port 77, while the $CO_2$ containing exhaust is discharged from port 87 to heat recovery. Cocurrent regeneration as shown in FIG. 3 may be replaced with countercurrent regeneration by introducing the preheated regeneration air to port 87, and discharging the exhaust from port 77.

Intermediate ports 76 and 78 in the first stator, and intermediate ports 86 and 88 in the second stator, are provided to enable buffer purge steps with steam or other inert gas between the hydrogasification and regenerations steps, so as to avoid hazardous direct contact of undiluted air with high concentration fuel gas. The intermediate ports may also be used for pressure equalization steps between the hydrogasification step performed at elevated pressure and the regeneration step performed at lower pressure or substantially atmospheric pressure.

Figure 5:
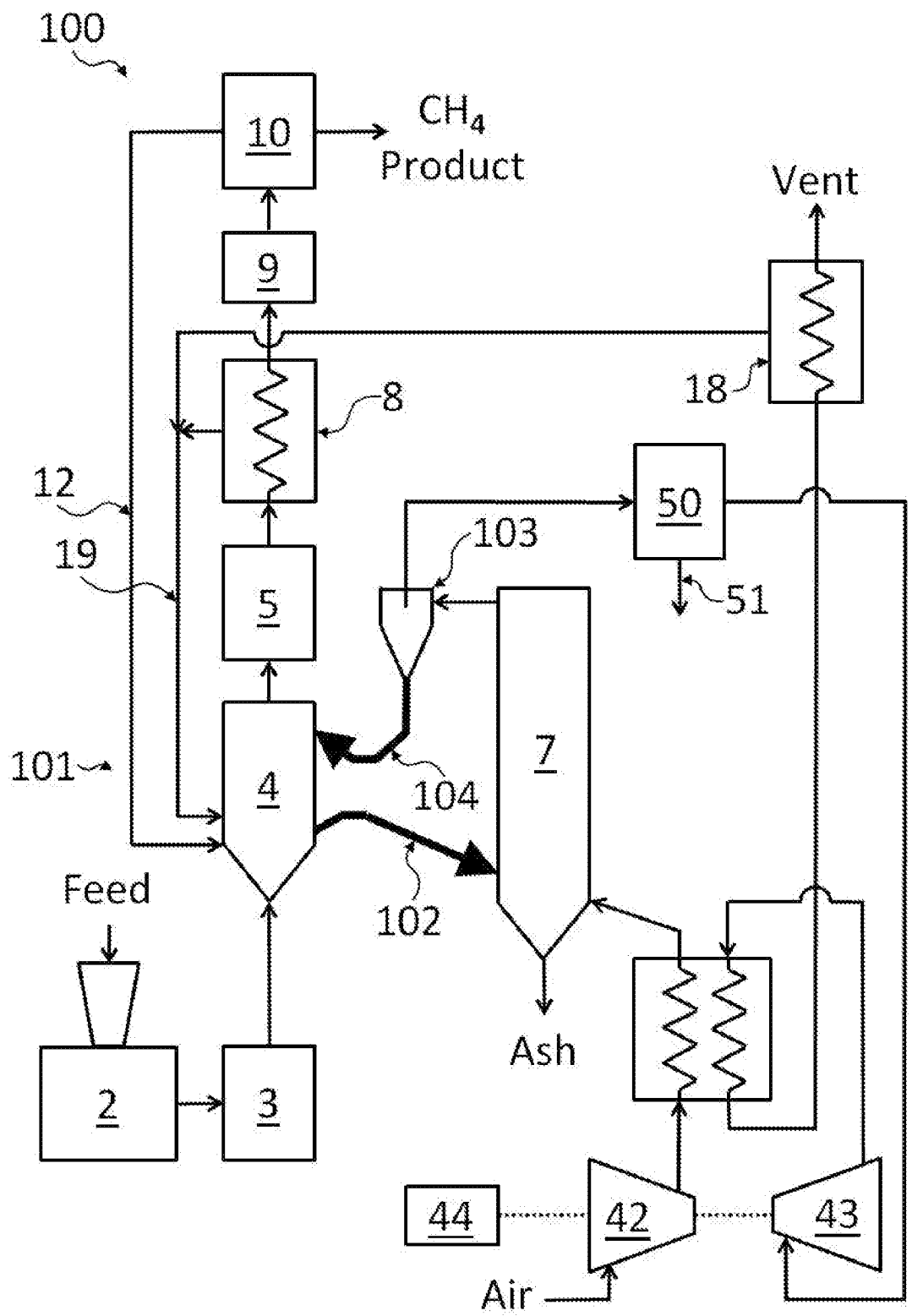
FIG. 5 shows a fluidized twin bed embodiment of the invention.

FIG. 5 shows a circulated fluidized twin bed embodiment 100 of the invention that would be particularly applicable to larger scale installations. Fluidized bed loop 101 includes a bubbling bed hydrogasification reactor 4 energized by recycle hydrogen from conduit 12 and steam from conduit 19, and a circulating fluidized bed regenerator reactor 7 energized by feed air from compressor 42.

The fluidized bed solid media includes CaO sorbent, preferably formed in composite mesoporous ceramic pellets. The ceramic (preferably also impregnated with transition group metal catalysts such as nickel, or noble metal catalysts such as rhodium with ceria) may itself have catalytic properties for reforming of pyrolysis gas and tars, and for methanation of syngas.

The granular media may be a mixture of sorbent, catalyst and heat exchange particles. The media should have high heat capacity, thermal conductivity and attrition resistance. Olivine sand is recognized as having excellent properties as heat transfer media in biomass gasification, including moderate catalytic properties for reforming tar constituents. Magnetite may also be useful as heat transfer media, with the potential advantage of downstream magnetic separation between the heat transfer media and char.

Carbonated sorbent, char and coked catalyst are transferred from hydrogasification reactor 4 to regenerator reactor 7 via siphon 102. Calcined sorbent and regenerated catalyst are transferred back from regenerator reactor 7 to hydrogasification reactor 4 via cyclone 103 and siphon 104. Ash may be released from the bottom of regenerator 7 by a lock hopper or an intermittently operated valve.

Figure 6:
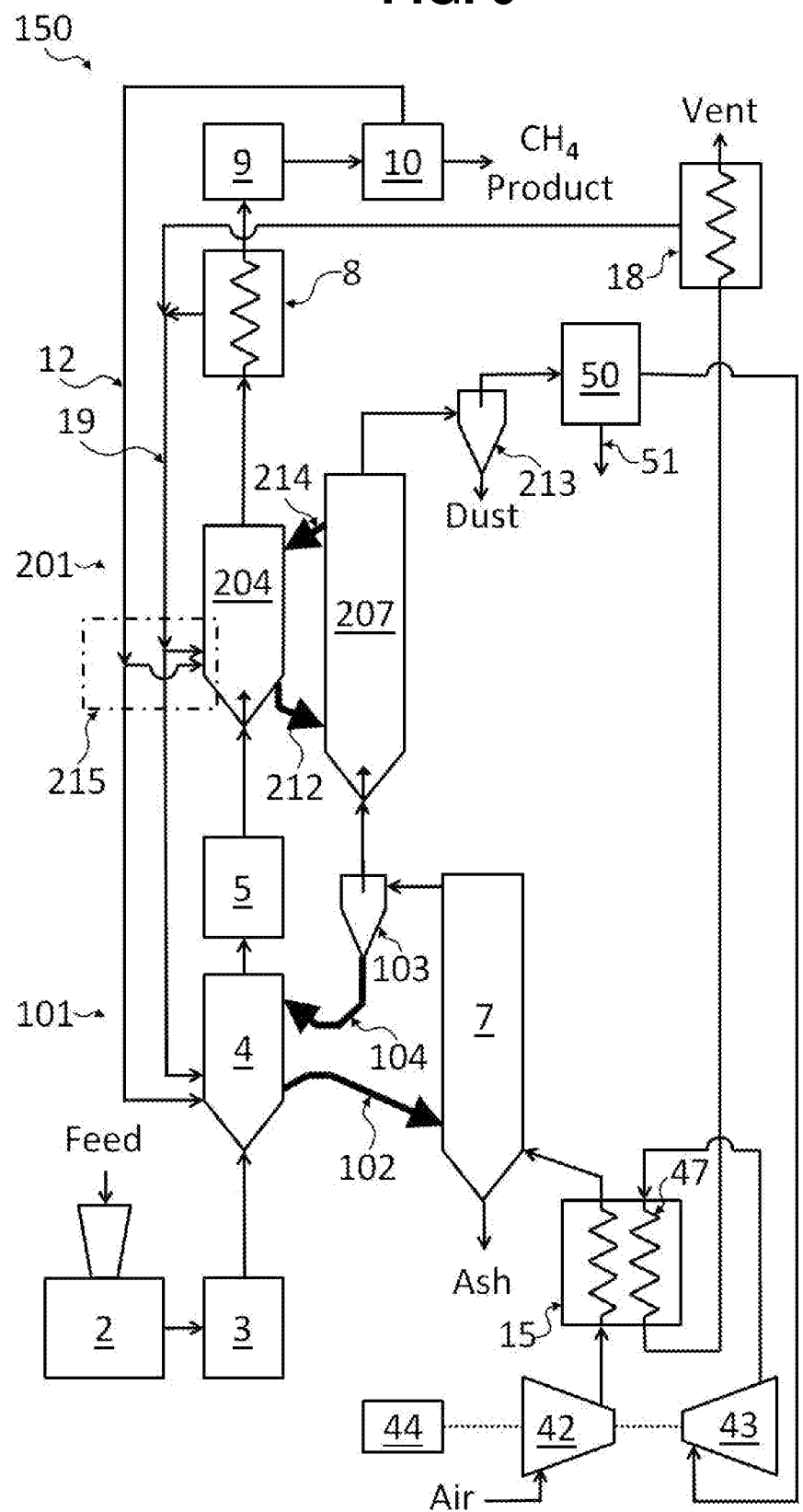
FIG. 6 shows a two stage double twin bed fluidized embodiment.

FIG. 6 shows a two stage fluidized bed embodiment 150, with the first stage 101 using relatively robust but less catalytically active media such as olivine or nickel impregnated olivine or glass-ceramic transition metal (e.g. Ni, Mo, W and combinations thereof) catalysts such as developed by the Gas Technology Institute, and the second stage 201 using more active and more delicate catalysts and lime sorbent for improved conversion of tars and higher yield of methane. In this embodiment, the first stage 101 is a fluidized bed reactor loop achieving hydropyrolysis and partial conversion to methane and hydrogen, while the second stage 201 performs more complete hydroconversion.

The solids separation section 5 may here include means to remove catalyst poisons (e.g. sulphur, chlorides, alkalis, etc.). Second stage fluidized bed loop 201 includes the second stage hydrogasification reactor 204, the second stage regeneration reactor 207. Deactivated catalyst and carbonate sorbent are transferred from hydrogasification reactor 204 to regenerator reactor 207 via siphon 212. Calcined sorbent and regenerated catalyst are transferred back from regenerator reactor 207 to hydrogasification reactor 204 via siphon 214.

The hot gas effluent from regenerator reactor 207 is delivered through cyclone 213 and hot-gas cleanup section 50 to the inlet of gas turbine expander 43.

Fluid control means 215 is provided to control flows of recycle hydrogen from conduit 12 and steam from conduit 19 to energize fluidized beds in first stage reactor 101 and second stage reactor 201. Fluid control means 215 may include control valves, expanders or compressors as needed to control flows and regulate pressures.

Figure 7:
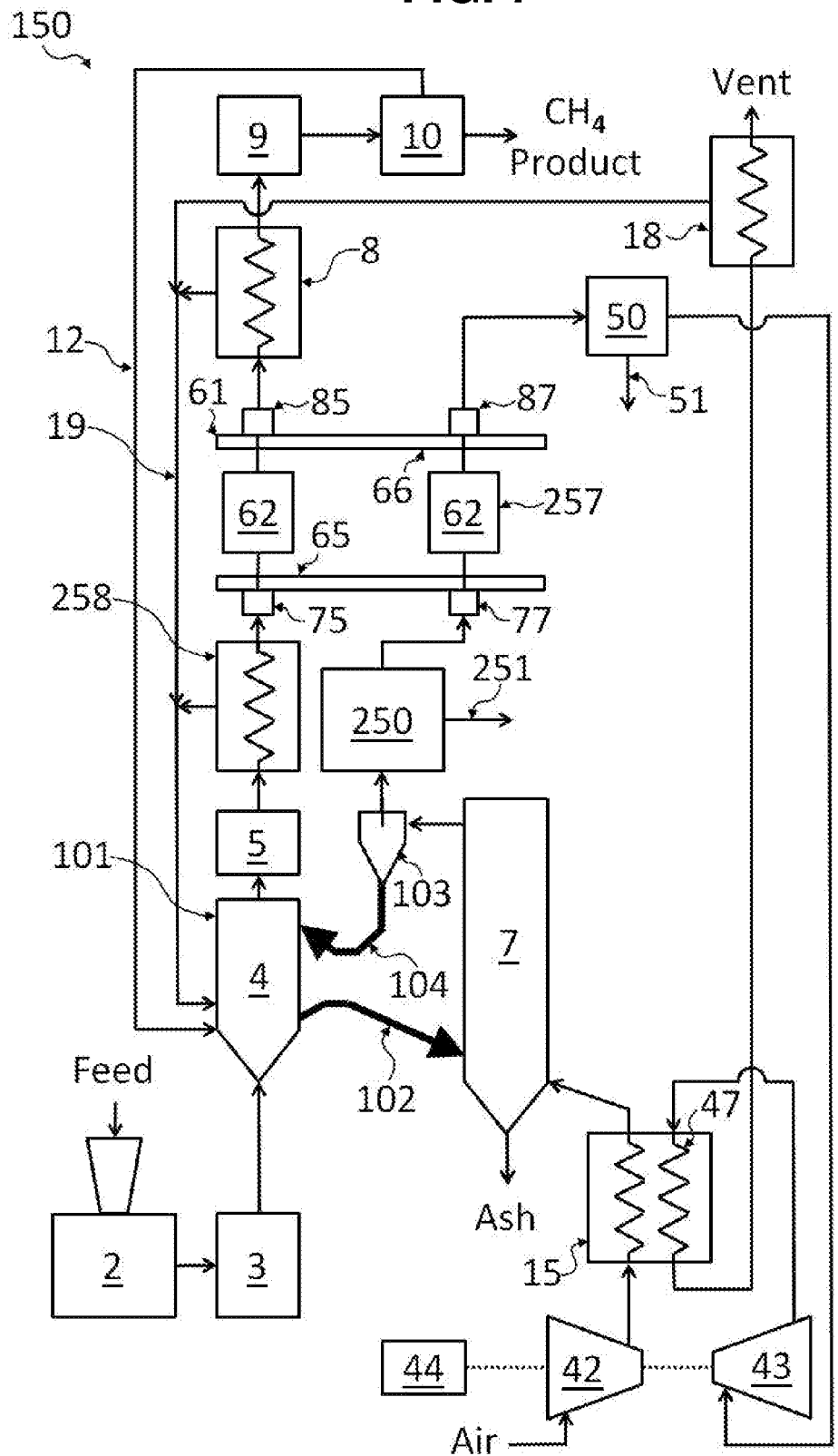
FIG. 7 shows a two stage embodiment, with the first stage a fluidized bed hydropyrolysis reactor and the second stage a methanation or hydroconversion reactor with a cyclic rotary switching mechanism.

FIG. 7 shows a two stage fluidized bed embodiment 250, with the first stage 101 a fluidized bed hydropyrolysis reactor as in embodiments 100 or 150, and the second stage a methanation or hydroconversion reactor 61 with a cyclic rotary switching mechanism for rotary fixed beds 62 as shown in embodiment 60. Beds 62 are switched cyclically between methanation or hydroconversion steps as reactor 254, and regeneration steps as reactor 257. Hot gas cleanup can be performed in cleanup section 250 with filtered solids and spent sorbents removed by discharge conduit 251. Heat recovery steam generator 258 may be provided to recover heat between first stage hydropyrolysis reactor 4 and second stage methanation or hydroconversion reactor 254.

Figure 8:
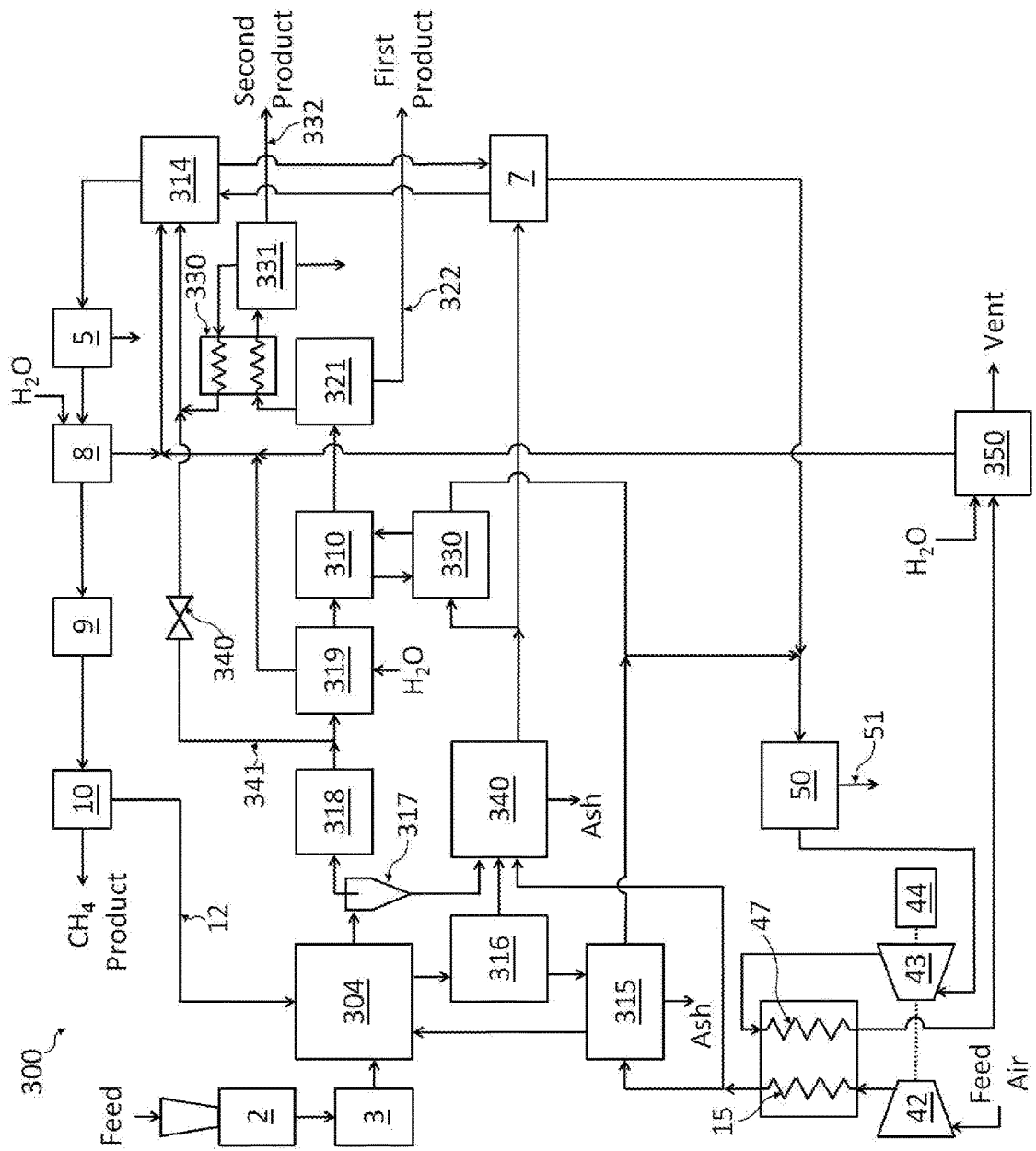
FIG. 8 shows an embodiment for coproduction of methane and liquid hydrocarbons.

FIG. 8 shows an embodiment 300 for coproduction of methane and liquid hydrocarbons with a three stage reactor system. A hydropyrolysis reactor 304 is provided upstream of a hydroconversion reactor 310 for production of liquid hydrocarbons, and itself upstream of a sorption enhanced reactor 314 for production of hydrogen and methane. The hydrogen from reactor is delivered to hydropyrolysis reactor 304. Reactor 304 provides rapid heating of the biomass particles to a pyrolysis temperature in the range from about 300° C. to about 500° C., in order to decompose the biomass into pyrolysis gas (including light hydrocarbons, some syngas, and tar vapours) and char. Heating may be achieved by mixing the biomass particles with a granular heat transfer media in a mechanical or fluidized bed contacting system. Various mechanisms are well known for fast pyrolysis reactors (e.g. auger reactors and circulating fluidized beds), and may be used in a mechanical contacting system in reactor 304. The granular heat transfer media should have high heat capacity, thermal conductivity and attrition resistance. Olivine sand is recognized as having excellent properties as heat transfer media in biomass gasification, including moderate catalytic properties for reforming tar constituents. Nickel-impregnated olivine has improved catalytic properties. The glass-ceramic catalysts developed by the Gas Technology Institute are believed to be superior for hydropyrolysis applications. Magnetite may also be useful as heat transfer media, with the potential advantage of downstream magnetic separation between the heat transfer media and char.

The heat exchange media is circulated between reactor 304 and a media heater 315, with pyrolytic char being discharged from reactor 304 with spent heat exchange media returning to the media heater 315. Combustion of char in media heater 315 may conveniently provide heat required for heating the feed biomass to reaction temperature and for the endothermic pyrolysis and initial gasification reactions. Ash is discharged from media heater 315.

A portion of the char exiting reactor 304 may be separated from the heat exchange media by char separator 316 as the feedstock for an auxiliary oxygen or steam gasification method to generate syngas. After water gas shift and $CO_2$ removal from the syngas, supplemental hydrogen may thereby be provided for the subsequent hydrogasification reaction. Alternatively a portion of the char separated by char separator 316 may be diverted to other external uses, including sale of charcoal as a solid fuel, or as a "bio-char" soil amendment for agriculture or forestry uses with an important purpose of carbon sequestration in the soil. Ash may also be a useful byproduct for soil enhancement and recycle of nutrients for overall sustainability of biomass cultivation, harvesting and utilization.

Solids are removed from the effluent pyrolysis gas exiting pyrolysis reactor 304 by a solids removal section 317 including one or multiple cyclones, and optionally also high temperature filters such as metallic or ceramic candle filters. A catalyst poison removal section 318 (including a desulfurization reactor using zinc oxide for $H_2S$ removal, and optionally including other sorbent beds for removal of chlorides and/or alkalis) may be included here for protection of downstream catalysts. The pyrolysis gas is also cooled by a heat recovery steam generator 319, either upstream or downstream of the catalyst poison removal sorbent beds.

The cooled pyrolysis gas is introduced to catalytic hydroconversion reactor 310, together with hydrogen (or hydrogen-rich gas) and optionally also with steam. Hydrogen reactively deoxygenates the pyrolysis gas components to generate a mixture of lighter and heavier hydrocarbons by hydrodeoxygenation and decarboxylation reactions. Hydrogen and steam act to crack larger molecules, and to inhibit coking. The reactor effluent is provided to a first separator 321 from which a liquid fraction of heavier hydrocarbons is delivered by conduit 322 as a first liquid hydrocarbon product for further processing and use as desired.

The overhead fraction from first separator 321 is cooled by heat recovery unit 330 to generate steam or preheat water upstream of second separator 331 in which water is condensed and separated from a liquid fraction of gasoline range hydrocarbons which is delivered as a second liquid hydrocarbon product by conduit 332 for further processing and use as desired. The overhead fraction of gases and vapours from second separator 331 contains $H_2$, CO, $CO_2$, $CH_4$ and other light hydrocarbons along with some water vapour. This fraction is reheated and admitted to sorption enhanced reactor 314, optionally together with a portion of the cleaned pyrolysis gas from catalyst poison removal section 318 as controlled by valve 340 in conduit 341.

Carbonation of CaO in sorption enhanced reactor 314 removes $CO_2$ and also CO by water gas shift. Light hydrocarbons are preferentially prereformed so that the product of sorption enhanced reactor 314 will be mostly hydrogen with methane as the main residual carbon-containing compound. After clean-up and cooling of this product gas mixture from reactor 314, gas separation system 10 separates substantially purified methane into SNG product delivery conduit 11, and a hydrogen-enriched recycle stream into conduit 12 and back to the hydropyrolysis reactor 304.

The gas separation system 10 may be operated to deliver a sufficient amount of hydrogen to the hydropyrolysis reactor and a significant amount of methane, with more methane production feasible if less liquid hydrocarbons are produced. In the absence of supplemental hydrogen imported to the process, approximately half the carbon in the feed biomass may be converted to product hydrocarbons (including heavier liquid hydrocarbons in the first product, gasoline range hydrocarbons in the second product, and product methane as a third product). The balance of the carbon is discharged as char or $CO_2$. Higher carbon conversion can be achieved with the addition of imported hydrogen.

The product split between methane and liquid hydrocarbons can be varied operationally by adjusting gas separation unit 10 so that more or less methane is delivered. With lower production of methane, more recycle hydrogen is available to the hydropyrolysis and hydroconversion reactors so that more liquid hydrocarbons are produced.

Production of liquid hydrocarbons can be maximized by turning off the delivery of product methane. In one embodiment of the invention, the gas separation system 10 is removed so that the entire product effluent of sorption enhanced reactor 314 is delivered to hydropyrolysis reactor 304, while liquid hydrocarbon delivery of the first and second products is accordingly augmented. Reactor 314 is then operating as a sorption enhanced steam reformer, with several advantages including (1) lower temperature operation than a conventional steam reformer, (2) convenient direct use of char combustion for regenerating the sorbent, (3) integrated water gas shift and $CO_2$ removal, and (4) scavenging of any alkali and chloride impurities in the recycle gas by the lime sorbent.

Regenerator reactor 7 and sorption enhanced reactor 314 comprise a coupled reactor pair for the working reaction and for regeneration of the sorbent and catalyst. A catalyst regeneration reactor 330 is also provided for decoking catalyst from hydroconversion reactor 310.

A portion of compressed air from compressor 42 and preheater 15 is provided to pyrolysis media heater 315 for combustion of char to heat the media, with flue gas heat being recovered in steam. The remainder of the compressed air from compressor 42 and preheater 15 is provided optionally with steam to regeneration reactors 7 and 330 to burn coke off the catalysts and decarbonate the $CaCO_3$ formed in sorption enhanced reactor 314. Heat recovery steam generators 8, 319 and 350 deliver steam to sorption enhanced reactor 314, or to regeneration reactors 330 and 7 as needed.

Figure 9:
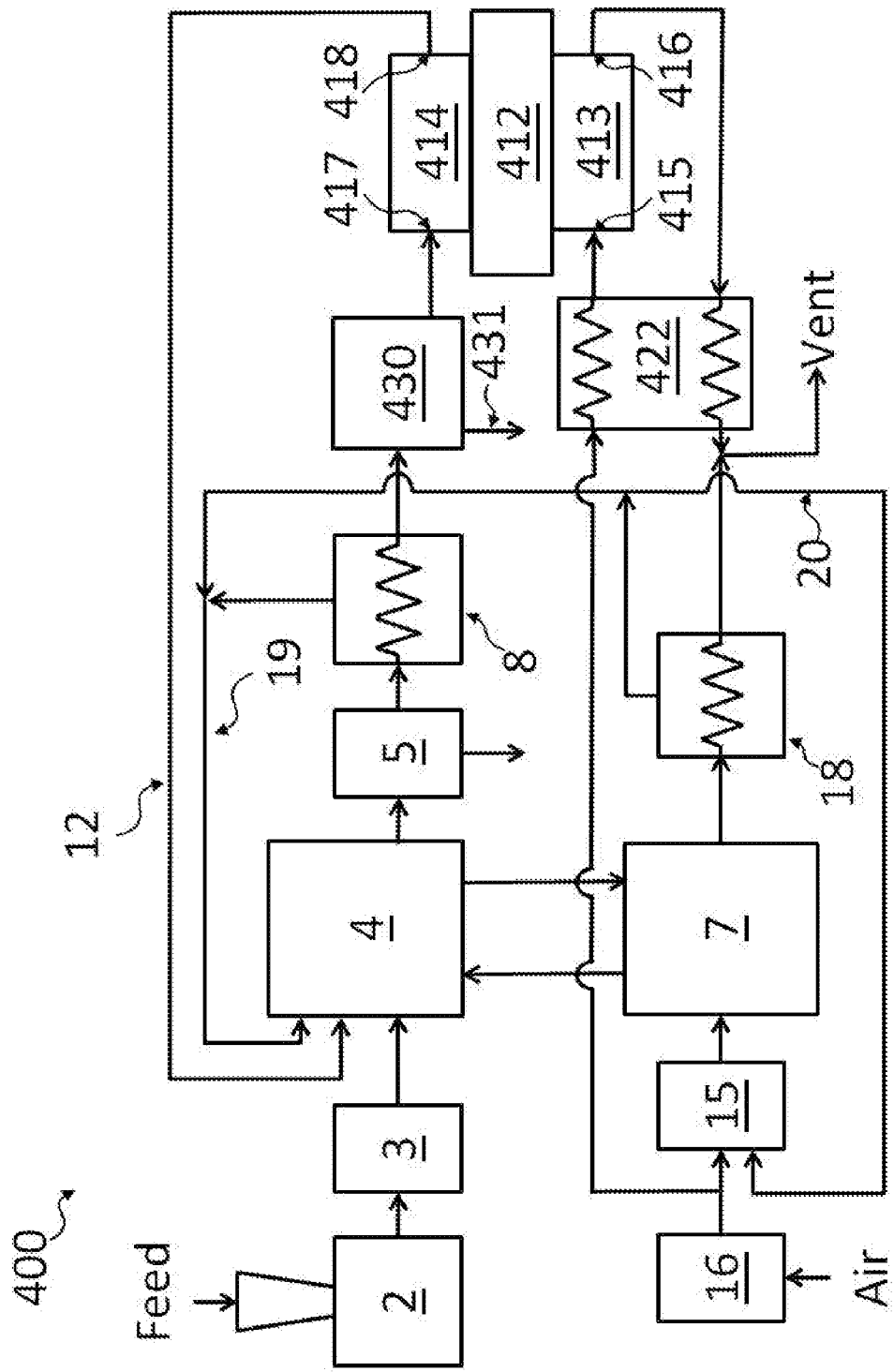
FIG. 9 shows an embodiment with a hydrogasification system coupled to a solid oxide fuel cell (SOFC) for generation of electricity.

FIG. 9 shows an embodiment 400, in which a hydrogasification system similar to embodiment 1 is coupled to a solid oxide fuel cell (SOFC) 410 for generation of electricity. The SOFC has a solid oxide electrolyte 412 between a cathode chamber 413 and an anode chamber 414. The cathode chamber has inlet port 415 and outlet port 416, and the anode chamber has inlet port 417 and outlet port 418. The anode chamber includes an internal reforming catalyst (which may be comprised within the anode itself) to convert methane and steam to hydrogen and carbon oxides CO and $CO_2$ under SOFC operating conditions at elevated temperatures in the range of about 600° C. to about 800° C.

A portion of the compressed air (or compressed oxygen-enriched air) from air compression unit 16 is heated in thermal recuperator 422, and fed to cathode inlet port 415. Vitiated cathode gas is discharged from port 416 and exhausted through recuperator 420 which recovers sensible heat from this gas.

A hot gas clean-up section 430 is provided to remove solid particulate, alkalis and any chloride or sulphur compounds that have not been captured by the sorbent. The hot gas clean-up section 430 may include cyclones, filters (metal fabric, ceramic candles or precoat filters), and chemical sorbents as necessary to capture the alkalis and any other detrimental components. Captured solids and spent sorbents will be released from discharge conduit 431.

Figure 10:
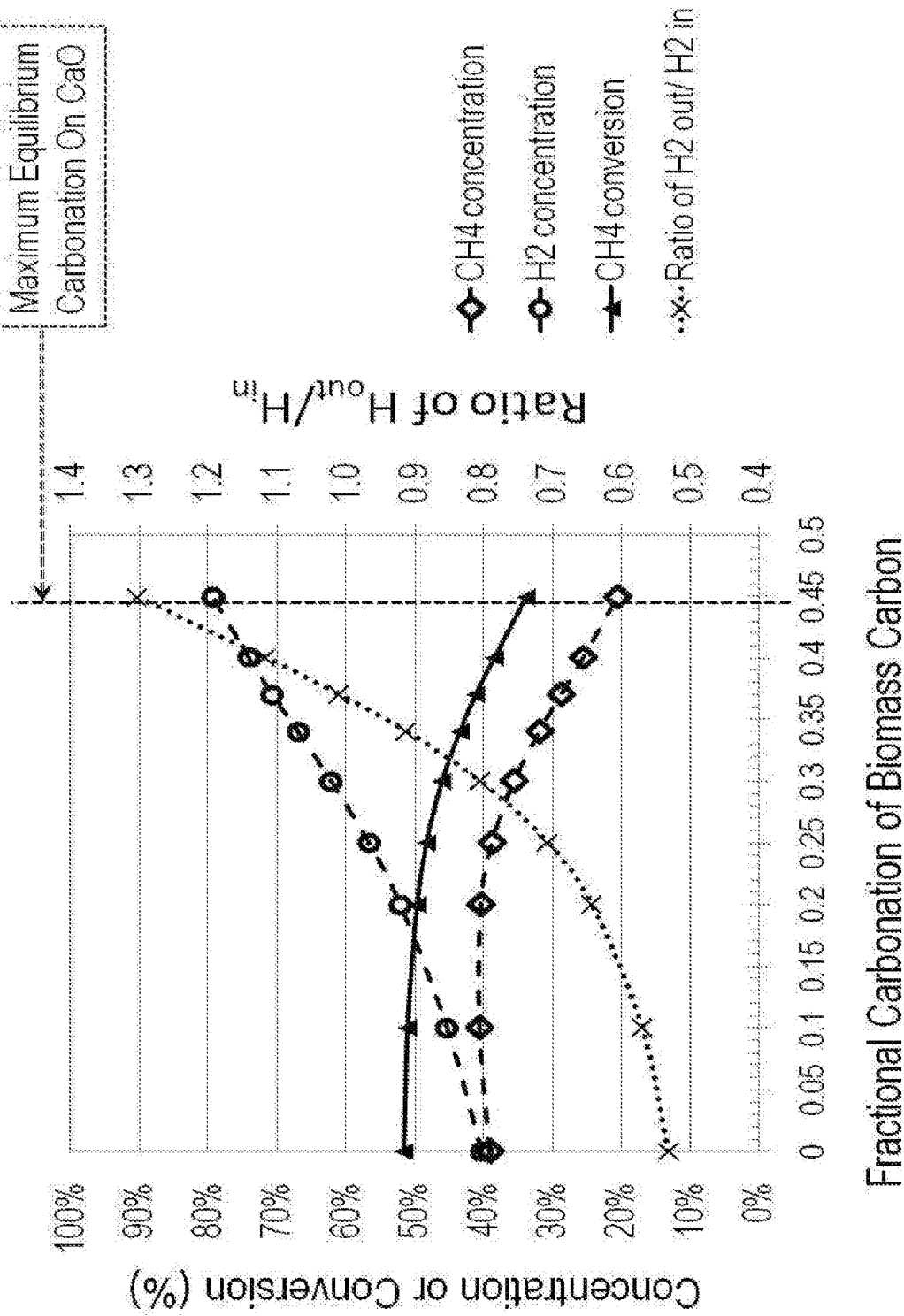
FIG. 10 is a graph of methane conversion, methane concentration, hydrogen concentration, and the ratio of hydrogen output to hydrogen input from the hydrogasification reactor of the invention, versus the ratio of carbon carbonated on the sorbent to carbon content of the biomass feed to the process.

FIG. 10 is a graph of methane conversion, methane concentration, hydrogen concentration, and the ratio of hydrogen output to hydrogen input ($H_{2out}/H_{2in}$) from the hydrogasification reactor of the invention, versus the ratio of carbon carbonated on the sorbent to carbon content of the biomass feed to the process.

These correlations were derived for the case of an AEM process operating with CaO sorbent at a temperature of 600° C. and a pressure of 10 bara, with 1.0 molecules of hydrogen and 0.6 molecules of water vapour (including initial water content within the biomass) provided per atom of carbon in the original woody biomass feed. Thermodynamic equilibrium was assumed for the water gas shift, steam reforming and methanation reactions, with methane the only hydrocarbon molecule participating in these post-pyrolysis reactions. Char and coke deposition was assumed to consume about 21% of feed biomass carbon.

Modeling runs were performed for different values of sorption uptake of carbon, shown as fractional carbonation of the original biomass carbon. Maximum fractional carbonation was found to be 0.4491, at which condition the partial pressure of $CO_2$ is at equilibrium with a mixture of CaO and $CaCO_3$. At a fractional carbonation of 0.370, the hydrogen output is equal to the amount of hydrogen input, thus defining an ideal self-sustaining condition without excess hydrogen generated or any external supplemental supply of hydrogen. With allowance for imperfect separation of product methane and recycle hydrogen, the practicable operating condition for self-sustaining hydrogen generation (without supplemental hydrogen supply from any external source) in this example will require fractional carbonation greater than 0.37, and of the order of 0.4.

The above example shows that high purity methane can be produced by the sorption enhanced methanation method according to the invention, with methane the predominantly surviving carbon compound after nearly complete removal of $CO_2$ and CO. This example contrasts dramatically with the related and well known process of sorption enhanced steam reforming of methane, where methane is nearly completely extinguished along with $CO_2$ and CO in order to achieve hydrogen production with highest possible conversion.

INDUSTRIAL APPLICABILITY

Disclosed embodiments of the method and system are useful for high efficiency conversion of biomass, including forestry residues (including those generated by logging, thinning, and wildfire prevention fuel load reduction activities) and sawmill waste into SNG, either as a fuel commodity or for high efficiency generation of electrical power. Disclosed embodiments provide advantageous integrations with gas turbines and/or solid oxide fuel cells. A portion of the biomass may also be converted into heavier and lighter hydrocarbon liquids.

Disclosed embodiments of the system may be used at industrial scale limited only by transportation distances for collection of biomass feedstock, or at smaller scale in rural or remote areas for combined generation of heat, high heating value fuel gas and electricity. At the smallest scale, the system may be used for residential heating, methane fuel production and electrical power generation through a solid oxide fuel cell or other energy converter consuming a portion of the product methane.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for converting a biomass feedstock into methane, comprising:
    introducing the biomass feedstock, a transition and/or noble metal catalyst, a sorbent, hydrogen and steam to a hydrogasifier;
    heating the biomass feedstock, the catalyst, the sorbent, the hydrogen and the steam in the hydrogasifier at a temperature and pressure suitable to form a gas stream comprising the methane, while simultaneously removing carbon dioxide by carbonation of the sorbent;
    regenerating the catalyst and the sorbent; and
    separating the methane from the gas stream.

2. The method of claim 1, wherein the hydrogasifier comprises a pyrolyzer and a hydroconverter, and the sorbent and the catalyst are located in the hydroconverter.

3. The method of claim 2, wherein heating the biomass feedstock comprises hydropyrolysis to form a pyrolysis gas and hydroconversion of the pyrolysis gas, the hydropyrolysis and hydroconversion being performed in staged reactors.

4. The method of claim 2, wherein the pyrolyzer is heated at temperature of from 300° C. to 500° C.

5. The method of claim 2, comprising subjecting the biomass feedstock to pyrolysis in the pyrolyzer to form a pyrolysis gas, and converting at least a first portion of the pyrolysis gas by hydroconversion in the hydroconverter that is separate from the pyrolyzer.

6. The method of claim 1, wherein regenerating the sorbent comprises heating the sorbent by combustion of char and any coke deposited on the sorbent or the catalyst.

7. The method of claim 6, wherein regenerating the catalyst comprises regenerating or decoking the catalyst while regenerating the sorbent.

8. The method of claim 1, wherein regenerating the sorbent comprises heating the sorbent with superheated steam.

9. The method of claim 8, wherein regenerating the catalyst comprises regenerating or decoking the catalyst while regenerating the sorbent.

10. The method of claim 1, wherein the sorbent is selected from calcined dolomite, calcium hydroxide, lithium zirconate, lithium orthosilicate, CaO, K-promoted hydrotalcite, K-promoted MgO, K-promoted dolomite, or a combination thereof.

11. The method of claim 1, wherein the catalyst is selected from Ni, Mo, W, Co, Pt, Pd, Ru, Rh, ceria, or a combination thereof.

12. The method of claim 1, where the pressure is from 5 bara to 50 bara.

13. The method of claim 12, wherein the pressure is from 10 bara to 20 bara.

14. The method of claim 1, where regenerating the sorbent occurs at a temperature of from 700° C. to 850° C.

15. The method of claim 1, wherein the gas stream comprises excess hydrogen and the method further comprises separating the excess hydrogen by pressure swing adsorption or membrane permeation.

16. The method of claim 1, wherein regenerating the catalyst and introducing the catalyst comprise regenerating the catalyst and introducing the catalyst using one of the following reactor configurations so that the catalyst will cycle between distinct reaction zones for hydrogasification and regeneration:
    a. a moving bed with a granular catalyst;
    b. at least one fixed bed with a granular packing or a monolithic catalyst, the at least one fixed bed having rotary or directional valve logic for cyclically switching the at least one fixed bed between reaction and regeneration; or
    c. a bubbling fluidized bed or a circulating fluidized bed.

17. The method of claim 1, further comprising generating electrical power with an internal-reforming solid oxide fuel cell fuelled by the methane and hydrogen converted from the biomass feedstock.

18. The method of claim 1, further comprising generating power with a gas turbine to recover heat from regenerating the sorbent.

19. The method of claim 1, further comprising removing the catalyst and the sorbent from the hydrogasifier prior to regenerating the catalyst and the sorbent.

20. The method of claim 1, wherein the hydroconverter is heated at temperature of from 200° C. to 650° C.

* * * * *